(12) United States Patent
Tsai

(10) Patent No.: US 6,266,298 B1
(45) Date of Patent: Jul. 24, 2001

(54) APPARATUS AND METHOD FOR INSCRIBING, OPTICALLY DETECTING, AND USING A CLOCK PATTERN TO WRITE A SERVO PATTERN IN AN INFORMATION STORAGE UNIT

(75) Inventor: John C. Tsai, Saratoga, CA (US)

(73) Assignee: Excel Precision Corporation, Santa Clara, CA (US)

( * ) Notice: Subject to any disclaimer, the term of this patent is extended or adjusted under 35 U.S.C. 154(b) by 0 days.

(21) Appl. No.: 09/084,039

(22) Filed: May 22, 1998

(51) Int. Cl.[7] ............................... G11B 11/00; G11B 7/00
(52) U.S. Cl. ..................... 369/13; 369/275.3; 369/44.26
(58) Field of Search ........................... 369/14, 13, 275.3, 369/44.26, 59.1, 53.11, 47.15, 47.16, 53.2, 47.1; 360/98.07, 99.08, 99.12, 75, 77.03, 78.11

(56) References Cited

U.S. PATENT DOCUMENTS

| | | | |
|---|---|---|---|
| 5,062,091 | * 10/1991 | Maeda et al. | ............ 369/13 |
| 5,315,372 | * 5/1994 | Tsai | ............ 356/358 |
| 5,406,545 | * 4/1995 | Kadowaki | ............ 369/275.3 |
| 5,761,171 | * 6/1998 | Tobita | ............ 369/59 |
| 5,771,130 | * 6/1998 | Baker | ............ 360/75 |

\* cited by examiner

*Primary Examiner*—Ali Neyzari
(74) *Attorney, Agent, or Firm*—Oppenheimer Wolff & Donnelly, LLP; Raymond E. Roberts

(57) ABSTRACT

Apparatus (10) and method (100) for inscribing a clock pattern (14), detecting the clock pattern (14) optically, and using the clock pattern (14) to write a sevo pattern in an information storage unit (12), such as a computer hard drive. The clock pattern (14) is inscribed using a marking system (64), which may include a laser (66) or employ other, even non-optical, methods. The clock pattern (14) is inscribable into various locations on a disk platter (16) inside the storage unit (12), including many outside the media surface (26) conventionally used for such in data storage units. While the disk platter (16) is rotating, the clock pattern (14) is on detected using an detection subsystem (46), if desired through a transparent window (36) in a hermetically sealed housing (34) of the storage unit (12), for use in writing the servo pattern with less sector-inconsistency error and off-track error.

12 Claims, 4 Drawing Sheets

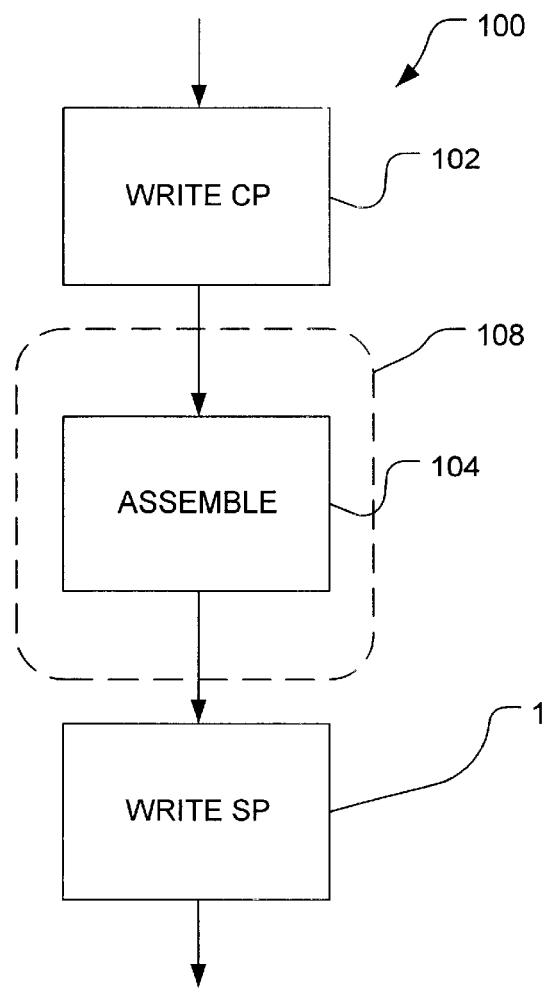
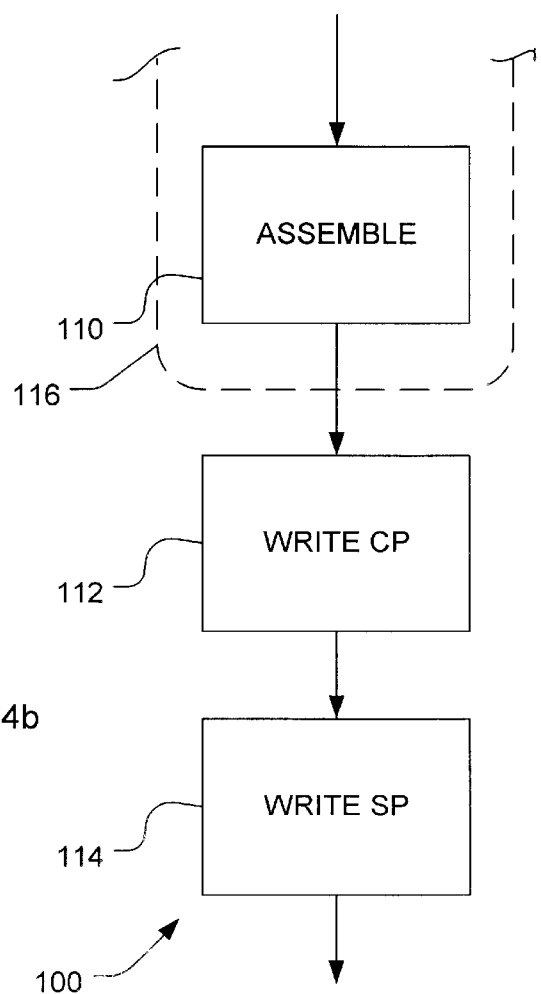
FIG. 4a
FIG. 4b

APPARATUS AND METHOD FOR INSCRIBING, OPTICALLY DETECTING, AND USING A CLOCK PATTERN TO WRITE A SERVO PATTERN IN AN INFORMATION STORAGE UNIT

TECHNICAL FIELD

The present invention relates generally to dynamic information storage and retrieval units, and more particularly to precise and efficient storage of timing and control information in the media structure of such units. The invention may be used on storage units employing rotating disks of magnetic, optical, or other media types. The inventor anticipates that the primary initial application of the present invention will be in the creation of clock information for use in writing servo tracks on magnetic media during assembly of rotating rigid disk storage units such as computer hard drives.

BACKGROUND ART

Dynamic data storage and retrieval has become of very great importance in our increasingly information based society. In both our work and enjoyment we typically use computers or computerized systems which read and write data on various storage media contained in removable or installed ("fixed") storage units. Users of such storage systems typically want to handle a lot of data both efficiently and safely, and at low cost. Today a ubiquitous example of a storage unit generally meeting these criteria is the hard disk drive (hereinafter "hard drive"). Worldwide some 200,000 hard drives are manufactured every day.

Hard drives consist of one or more spindle mounted disks which have magnetic media on one or, more typically, both major sides. The terms "disk pack" and "disk platter" (or even simply "platter") are widely used terms for an assembly of such disks. A motor is provided to rotate the disk assembly and arms bearing read/write heads ("R/W head") are positioned pivotally or linearly above the media to magnetically write or read data into and from the media (an assembly of such arms and R/W heads is commonly termed a "head stack"). To efficiently and reliably later access user data a scheme of concentric tracks and sectors within those tracks are defined during hard drive manufacturing using a process called "servo track writing." This process places servo data in a proprietary coding in the disk media called a "servo pattern." Data storage density in hard drives thus very much depends upon how densely such tracks and sectors can be defined and reliably used. Hard drives coming available today have track densities as high as 10,000 tracks per inch (TPI), and manufactures hope to obtain 20,000 TPI in the next 3–5 years.

Accurately manufacturing hard drives economically and in large quantity is not easy. For example, due to the limitations of mechanical tolerances inherent to manufacturing, the actual speed of rotation of disk platters is not exactly the same in every unit produced. If a hard drive is designed to optimally store n sectors of data in each track, platter revolution speeds that cause n−2 or n+¾ sectors to be written can cause unexpected and even disastrous results (often at some later point outside of the closely controlled manufacturing environment). Such variation can be termed "sector-inconsistency error." Of course, the hard drive can be designed with tolerances to accommodate an expected degree of sector-inconsistency error, but that seriously undercuts the goal of achieving a high data-per-track storage density.

Further, similarly due to manufacturing limitations, the disk platter rotation is never perfectly circular. If this imperfection is severe enough it can even cause the coding to be mistakenly written to a different data zone, called an "off-track error." One solution for this is to allow the physical width of the track to be such that the possibility of off-track error becomes negligible, but this reduces the TPI and seriously undercuts the goal of achieving a high data-per-platter storage density.

To address these problems, and to a lessor extent others as well, the industry has turned to putting clock information into hard drives prior to writing the servo information. FIG. 1 (background art) is a simplified depiction of this (as noted above, actual hard drives are typically much more complex than this, but this simplification illustrates the necessary principles of operation). Within a workpiece hard drive 1 (shown only in pertinent detail) a media disk 2 rotates on a hub 3. A clock arm 4 bearing a clock head 5 is then introduced and a clock pattern, i.e., a clock track 6, is written at the outer periphery of the media disk 2. Once the clock track 6 is written, the clock head 5 is used to read it back and the regular R/W head 7 of the hard drive 1 is used in a synchronized manner to write the desired servo pattern into the media disk 2.

A servo pattern may also be complex. It may be embedded throughout the data storage area on the media disks or placed on a single media surface dedicated to it (a servo pattern is intentionally not shown in any of the drawings herein because of the confusion which doing so might cause; also, an older wedge servo system has been used in hard drives but is now obsolete). However, it should be noted that in a hard drive only one clock track is needed.

The process of writing the clock pattern and the servo pattern is quite complex, and requires extremely precise timing, measurement, and positioning. First the clock pattern must be written. The platter of media disks is brought up to its operating speed, which commonly will be 5,400, 7,200, or even 10,000 rpm, and an initial clock pattern is written using the clock head. However, this initial pattern usually has one clock increment which is less than or greater than the others (e.g., n−½ or n+¾), and in extreme cases the number of clock increments may even be less than or greater than desired (e.g., n−1 or n+2). Therefore, to create consistent clock information, the initial clock pattern is read back as a measurement of actual hard drive conditions, calculations are performed to determine what is needed to obtain a clock pattern with the desired number of consistent increments, and based upon this a final clock pattern is written.

Next, the media disks are maintained at operating speed and the clock head, which is still introduced to the hard drive, is used to read back the clock pattern while the R/W heads are used to write the servo pattern. Feedback from the clock pattern is used to write the servo pattern in a manner such that data will later be stored in a desired and consistent number of sectors. Concurrently, this feedback from the clock pattern is also used to insure that servo track writing accurately follows the rotation of the disk and that the R/W heads are adjusted to write the servo pattern in a more perfect circle. During this process feedback techniques are used to measure and position the actual R/W heads very accurately during the actual servo pattern writing. Today, laser interferometry generally is used for this but some manufacturers also employ optical encoders.

Unfortunately, there are a number of problems, compromises and lost efficiencies associated with the above-described use of a magnetic disk based clock pattern. It should be appreciated that the clock head and clock pattern are used only in hard drive assembly. Obviously, if the area used by the clock pattern, i.e., the clock track, could otherwise be used for data storage this would increase the storage capacity of the hard drive. Further, because the clock head and the associated electronics for it are expensive and cumbersome, hard drive manufacturers understandably prefer to make these part of the external manufacturing apparatus, rather than include instances of them in every hard drive being produced. But this means that the clock head must specially be introduced into the hard drive during assembly, slowing the assembly process, and perhaps more importantly putting tooling and product in harms way (those familiar with the art of magnetic recording will readily appreciate that for the clock head to write and read the media surface it must be brought very close, typically on the order of 6 micro-inches).

However, to the inventor, based upon his own years as a provider of equipment to many of the largest hard drive manufacturers, the biggest cause for concern is the level of cleanliness which must be maintained during assembly of many storage units using current techniques. As touched upon above, head to media clearances are very small and the relative speed between these when in operation is extremely high. Any contamination that enters the confines of such a storage unit can have catastrophic consequences, which hopefully will turn up early before the manufacturer performs final tests on the unit, but which all to often instead turn up later and cause the loss of an ultimate user's precious data.

Among computer users the term "head crash" is all too well known, it means the catastrophic loss of data by damage to the media surface or even loss of the entire hard drive due to the disk platter and head stack literally jamming. The present inventor frequently has removed part of a hard drive housing to display aspects of working hard drive operation. It has been his observation that in a few hours, maybe a day, some media degradation occurs, as evidenced by the drive having seek problems. Then within a day, or typically at most a week, the hard drive completely jams up. To additionally understand this phenomena in hard drives it should be appreciated that static charged particles are readily attracted to and build up on magnetically charged media surfaces.

Hard drive manufacturers also dread head crashes, because dissatisfied customers often will never buy a product from them again. (This is not at all an exaggeration. Among repair personnel and computers users prejudices are easily built from a few bad experiences, and then often vehemently verbalized to others, which undercuts the market goodwill of the often coincidental particular manufacture.)

To prevent contamination, manufactures resort to using clean rooms for assembly. In hard drive manufacturing the current standard for cleanliness is "Class 10," and the cost of a clean room to achieve this is very high. Based upon the inventor's own experience and extensive conversations with experts in the field, this exceeds U.S. $10,000,000 per hard drive manufacturer today. Further, even with class 10 clean room facilities, rigorous and tedious process control is needed to ensure that no contamination is introduced.

Work has been done in the industry to try and eliminate the need for such cleanliness and the need for clean rooms, but until the present invention this has not become possible. For example, the present inventor is the inventor also of U.S. Pat. No. 5,315,372 for a "Non-Contact Servo Track Writing Apparatus Having Read/Head Arm And Reference Arm," and a number of currently pending patent applications for non-invasive servo pattern writing. Using such non-invasive techniques for servo pattern writing has reduced but not eliminated the need to have storage units open during assembly, because there must still be at least one open portal for the clock head access during clock pattern writing.

Accordingly, what is needed for manufacturing of some important classes of information storage units today are apparatus and methods to better write clock patterns. Such solutions should very preferably work on sealed storage units; and it is highly desirable that they not introduce any new instances of, or even better still, reduce or eliminate existing problems, compromises, or lost efficiencies related to the manufacturer of such information storage units.

DISCLOSURE OF INVENTION

Accordingly, it is an object of the present invention to provide servo pattern writing techniques usable on hermetically sealed information storage units.

Another object of the invention is to eliminate the need to dedicate a portion of the storage media in information storage units to storage of a seldom used clock pattern.

Another object of the invention is to modify storage unit assembly techniques to minimize or even eliminate providing and maintaining clean assembly environments.

And, another object of the invention is to modify storage unit assembly techniques so that they are more flexible in ordering the various steps required.

Briefly, a first preferred embodiment of the present invention is an apparatus for inscribing a clock pattern in the platter of an information storage unit using rotating disk shaped storage media. The apparatus includes a laser system to emit a light beam used to mark the platter in a manner which is later optically detectable. A directing assembly is provided to direct the light beam to a target position in an annulus (a ring) defined somewhere on the platter and centered about its axis of rotation. A controller is provided for controlling both the laser system and the directing assembly so that a desired number of clock marks are inscribed in the annulus, all consistently spaced apart, to form an optically created and detectable clock pattern.

Briefly, a second preferred embodiment of the present invention is a method for inscribing a clock pattern in the platter of an information storage unit using rotating disk shaped storage media. An annulus is specified somewhere on the platter which is nominally centered about its axis of rotation. Then a separation value is calculated equal to the circumference of the annulus divided by the number of the clock marks desired in the clock pattern (an integer value). Optically detectable clock marks are then inscribed in the annulus such that each adjacent pair is consistently spaced the same distance apart by the separation value and their total number equals the desired number of clock marks in the clock pattern.

Briefly, a third preferred embodiment of the present invention is a method for writing a servo pattern in an information storage unit having a rotating platter of disk shaped storage media. The platter is provided with a clock pattern already inscribed in it, and is assembled into the storage unit. The platter is then rotated within the storage unit. The clock pattern is optically detected, i.e., read back. And the servo pattern is written into the storage media in relation to the clock pattern.

Briefly, a forth preferred embodiment of the present invention is a different method for writing a servo pattern in an information storage unit having a rotating platter of disk shaped storage media. The storage unit is assembled, and the platter is rotated in it. Then a clock pattern is inscribed into the platter. This clock pattern is detected optically, i.e., read back. And the servo pattern is written into the storage media in relation to the clock pattern.

Briefly, a fifth preferred embodiment of the present invention is a different method for writing a servo pattern in an information storage unit having a rotating platter of disk shaped storage media. The platter is provided with a clock pattern already inscribed in it. During assembly of the storage unit, a window is installed and the storage unit is sealed hermetically. The clock pattern is then detected optically through the window, and used for servo pattern writing.

Briefly, a sixth preferred embodiment of the present invention is a different method for writing a servo pattern in an information storage unit having a rotating platter of disk shaped storage media. During assembly of the storage unit, a window is installed and the storage unit is sealed hermetically. Then a clock pattern is inscribed in the platter optically through the window. The clock pattern is then detected optically through the window, and used for servo pattern writing.

Briefly, a seventh preferred embodiment of the present invention is an apparatus for writing a servo pattern in an information storage unit having a rotating platter of disk shaped storage media. A measuring system is provided for measuring angular position of the platter while the storage unit is hermetically sealed. A writing system is provided for writing the servo pattern into the storage unit in relationship to what the measuring system measures.

An advantage of the present invention, since the workpiece storage unit may be sealed, is that a less stringent manufacturing environment may be used. For example, when the workpieces are conventional hard drives the process of servo pattern writing can now be entirely carried out without using expensive, and notoriously difficult to operate and maintain clean room environments.

Another advantage of the invention, since all sensing may be performed optically, is that much greater sensing distances can be employed, all reliably and speedily, and with considerably reduced risk of damage to tooling and the storage units being assembled. For example, while magnetic heads must typically be positioned within a few microinches of the media containing what is being sensed, most optical methods can be used at distances of a few centimeters or even further away. Use of the invention can eliminate the tedious nature of this operation, the risk of the sensing device damaging the media, and concurrently make the results of the sensing operation more reliable.

Another advantage of the invention is the ability to now use optical sensing permits techniques, heretofore not easily used or even possible using prior art techniques like magnetic sensing. For example, optical quadrature sensing, which is widely used with optical media like compact disks, can be employed with some variations of the present invention to enhance the accuracy of sensing the increments in a clock pattern.

Another advantage of the invention is that the clock pattern can be placed anywhere readily accessible on the rotating assembly, on the hub, the periphery of a major disk surface, or even on the outside edge, thereby providing considerable manufacturing flexibility and in some case even freeing up for other use precious media area which would previously have been needed for clock pattern storage.

And another advantage of the invention is that the clock pattern can be written and read, i.e. accessed, from a large range of angles, rather than from merely a normal angle. Thus, while conventional vertical access or even horizontal access can be used, off-normal writing is possible and paired off-normal emitting and sensing devices can also be used for reading. For example, a light beam can be directed from an emitting device to the a clock pattern at a 45 degree angle, and reflected back to a reading device at an incident 45 degree angle.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 4a is a flow chart depicting one possible variation in storage unit assembly methods using the present invention, while FIG. 4b depicts an alternate variation.

BEST MODE FOR CARRYING OUT THE INVENTION

Figure 1:
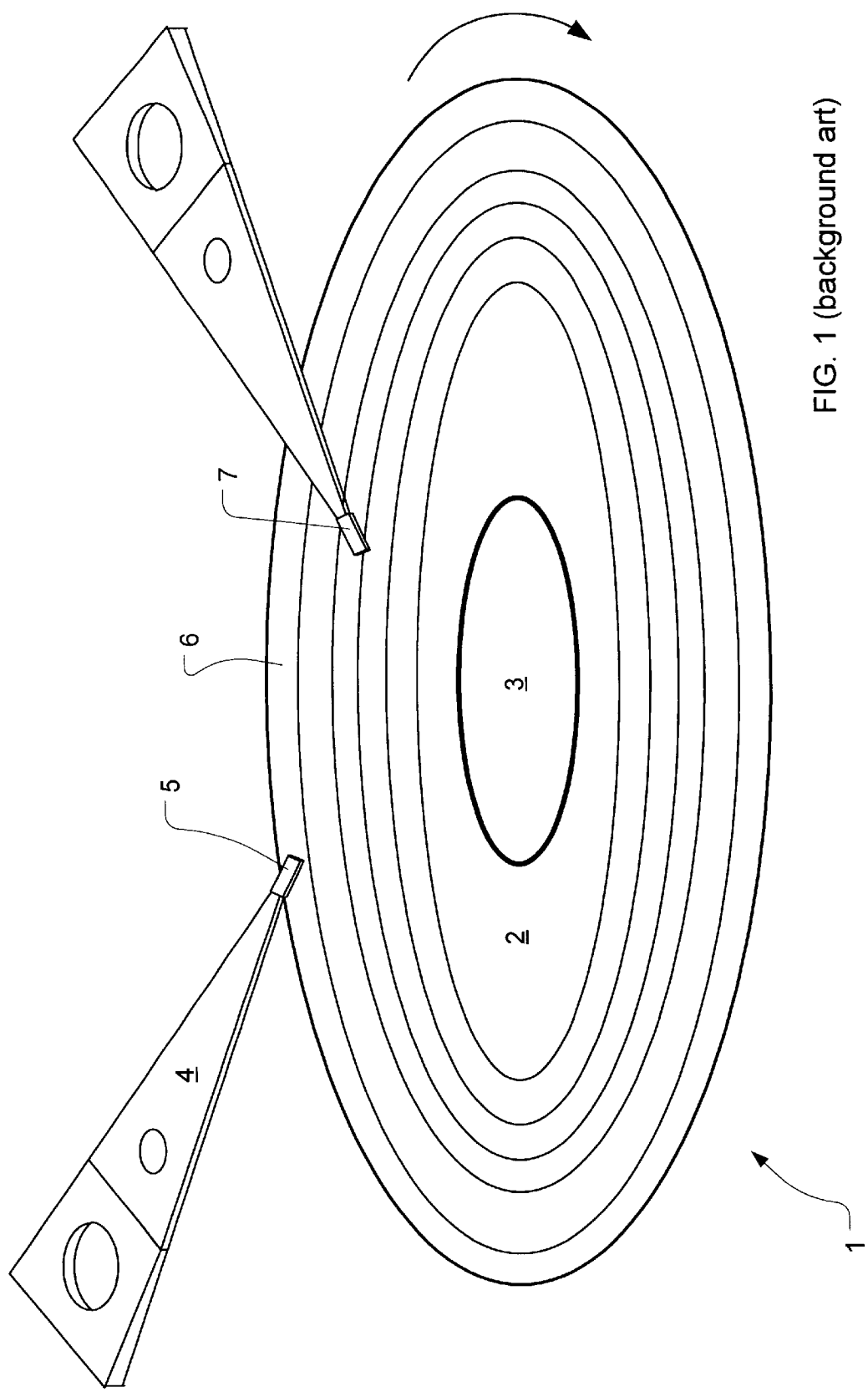
FIG. 1 (background art) is a stylized depiction of conventional hard drive clock pattern and servo pattern writing.

A first preferred embodiment of the present invention is an apparatus for writing a servo pattern in storage units employing rotating media disks. As illustrated in the various drawings herein, and particularly in the view of FIG. 2, a form of this preferred embodiment of the inventive device is depicted by the general reference character 10. By way of example, but without limitation thereto, the invention is herein illustrated and discussed in application on a workpiece hard drive 12.

In the following discussion the term "write" will be used to mean the placing of data or coding into media. Hence a servo pattern and prior art clock patterns are described as being "written." In contrast, the term "inscribe" will be used, in a broader sense, to mean marking which may or may not be on conventional media. Hence the clock patterns herein are described as being "inscribed." Further, the phrase "optical clock pattern" as used herein means an optically detectable clock pattern, but not necessarily one which has been created with optical methods.

Figure 2:
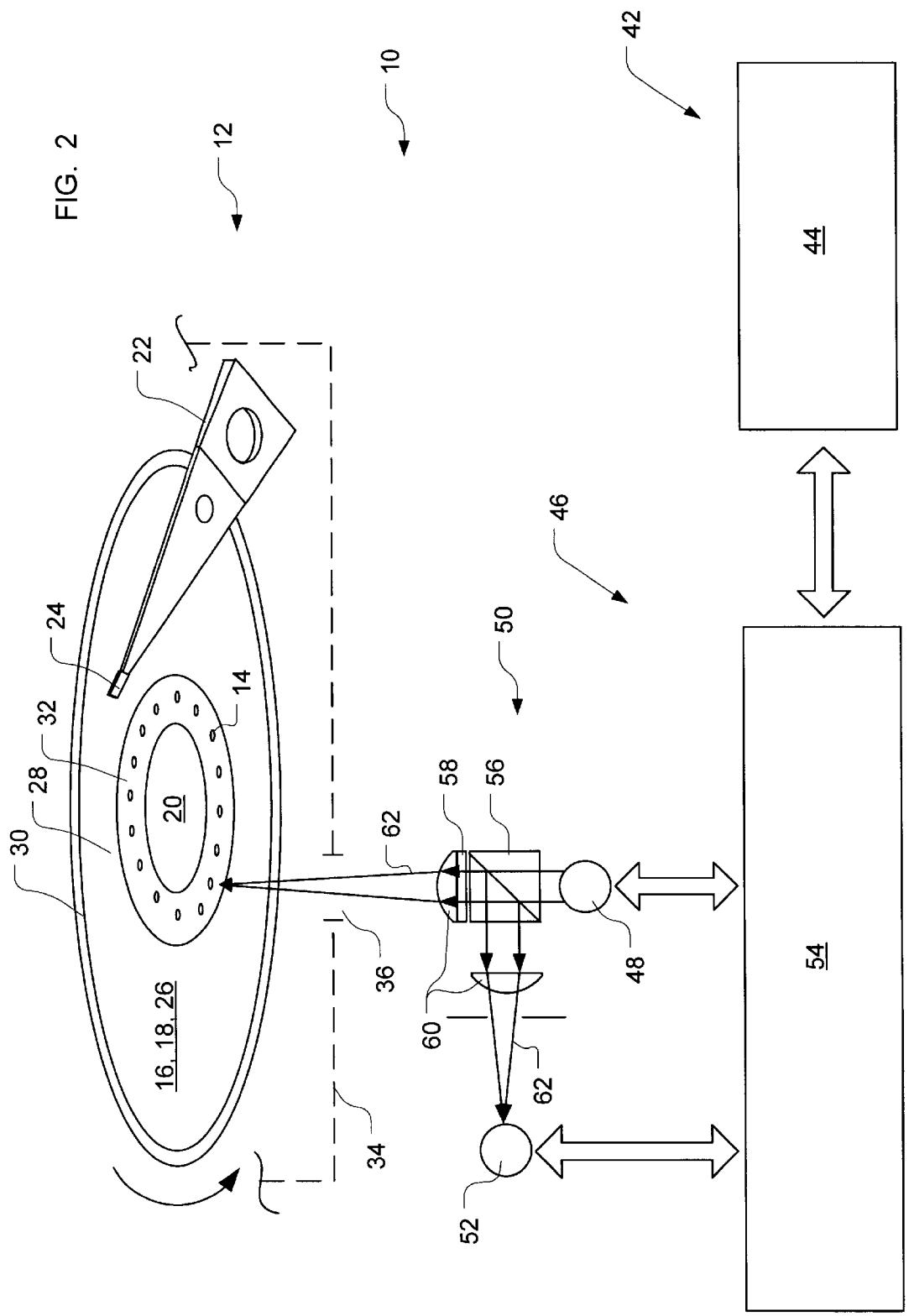
FIG. 2 is a stylized depiction of using a previously inscribed clock pattern to write a servo pattern.

FIG. 2 depicts the inventive optical clock pattern apparatus 10 in use to write a servo pattern by employing a previously inscribed optical clock pattern 14. Only pertinent components of the workpiece hard drive 12 are shown. These include a disk platter 16 having a single media disk 18 which is mounted on a hub 20. Further included is a read/write arm (R/W arm 22) bearing a read/write head (R/W head 24). The media disk 18 has at least one media surface 26 having a central region 28 bounded by an outer region 30 and an inner region 32. The central region 28 is fully accessible by the R/W head 24, for writing the servo pattern and then for writing and reading general data once the hard drive 12 is put to use. In contrast, the outer region 30 and the inner region 32 are not used for data storage and need not even be accessible by the R/W head 24. All of these components may, optionally but preferably (as discussed in detail below), be enclosed in a drive housing 34 (only partially shown, and then in ghost view) which has a housing window 36. Of course, also present in workpieces such as the hard drive 12 is a drive system to rotate the disk platter 16, typically a spindle motor 38 (numbered for reference but not shown). Similarly, to position the R/W arm 22 a drive system such as a voice coil motor (VCM 40; also numbered for reference but not shown) will be present.

To write the servo pattern a servo writer 42 is provided. This may be largely conventional except for the portions used to read the previously inscribed optical clock pattern 14. (depicted for presentation in FIG. 2 as visible to the unaided eye, although such will probably rarely if ever be the case in actual practice). The servo writer has a writer controller 44, and an interface to the hard drive 12 to direct positioning of the R/W arm 22 therein. Further, because of the extreme precision with which servo patterns usually must be written, a measurement system (not shown) is almost always present to achieve, verify, and maintain desired positioning of the R/W arm 22 using servo loop feedback techniques. Typically this measurement system uses a laser interferometer, but optical encoders are sometimes also used.

Prior art servo writers (as depicted in FIG. 1 (background art)) have a clock arm 4 bearing a clock head 5, a system to introduce this into the drive housing (not shown) and to position the clock head 5 over some portion of the media disk 2 (typically but not necessarily an outer region), and control capability (not shown) to write and read back a magnetic clock pattern (i.e., a clock track 6) and then based upon this to direct writing of the servo pattern (not shown, since current practice is generally to embed this throughout the data storage area of the media disk 2).

In contrast, in FIG. 2 the servo writer 42 employs an detection subsystem 46 which has a light source 48, a beam directing assembly 50, a sensor 52, and a sub-controller which operates these other components. In the inventor's presently preferred embodiment, the light source 48 is a laser diode, the sensor 52 is a photo detector, and the beam directing assembly 50 includes a polarizing beam splitter 56, a quarter wave plate 58, and focusing lenses 60.

In operation, the servo writer 42 of the inventive optical clock pattern apparatus 10 directs a beam 62 from the light source 48 through the beam directing assembly 50 to the optical clock pattern 14, which in FIG. 2 is shown located in the inner region 32 of the media disk 18. The beam 62 is there affected (effectively "modulated") by the optical clock pattern 14 as the disk platter 16 is rotated by the spindle motor 38. Portions of the beam 62 are reflected back into the beam directing assembly 50 where they are routed onward to the sensor 52. The sensor 52 detects the returned portion of the beam 62 and from this the sub-controller 54, using generally conventional electronic signal processing techniques, extracts and passes on to the writer controller 44 clock information which is used to assist in controlling writing of the servo pattern (much as a prior art clock head based system would).

Figure 3:
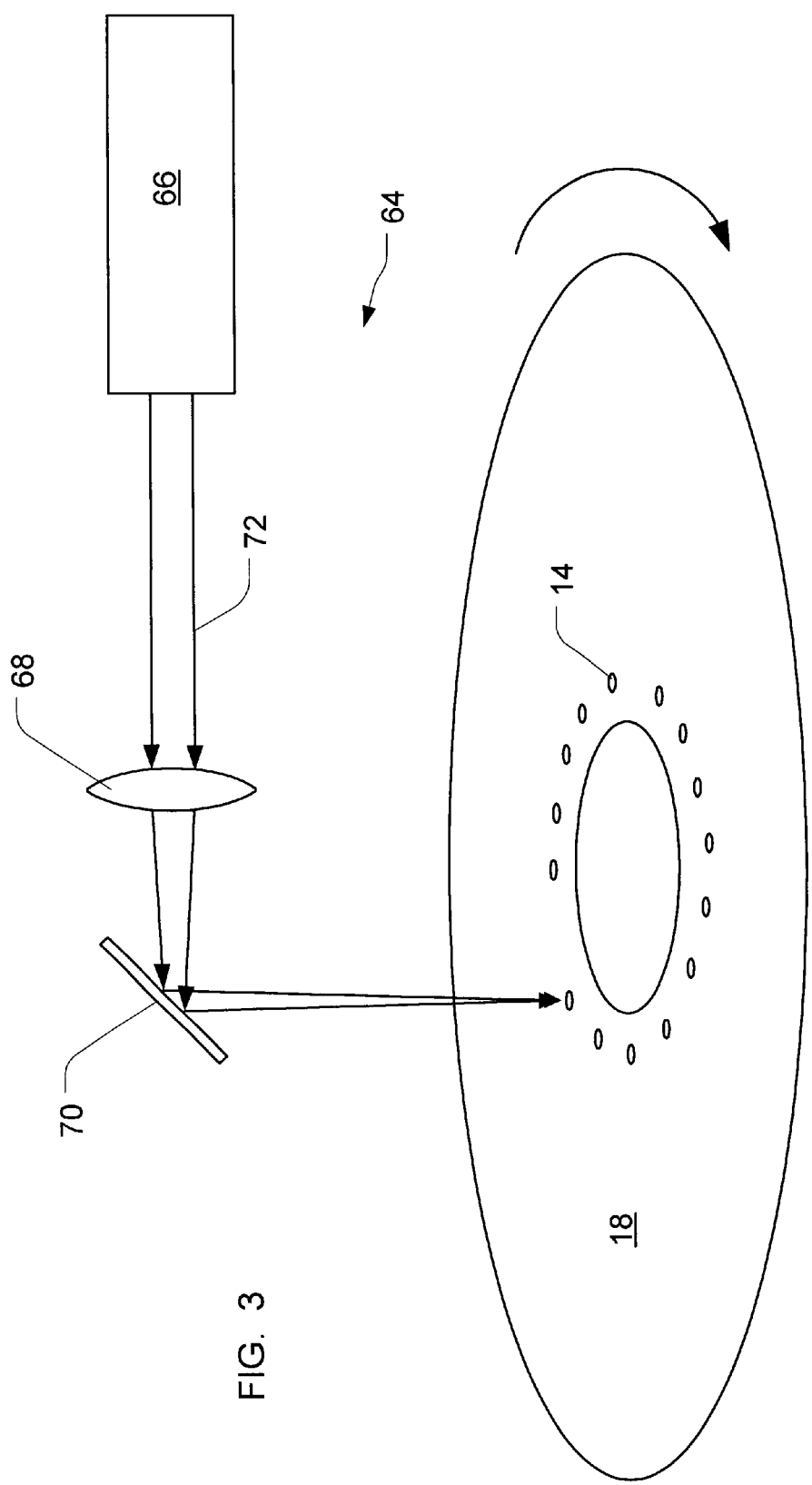
FIG. 3 is a stylized depiction of one technique to inscribe the clock pattern used in FIG. 2.

FIG. 3 depicts one technique to inscribe an optical clock pattern 14. The media disk 18 is temporarily mounted in a fixture (not shown) and rotated, but not necessarily at the same speed as it will rotate later in the hard drive 12. A marking system 64 is then used to "inscribe" the optical clock pattern 14 into the media disk 18 in the form of pits, bumps, or even mere surface discoloration (generally by melting action, although some potentially suitable lasers today use non-thermal principles to physically affect or even remove material). The inventor's currently prefered implementation of the marking system 64 includes a pulsed yttrium aluminum garnet (YAG) laser 66, a focusing lens 68, and a mirror 70, all to create an appropriate beam 72 (more complex optics, and other types of lasers, e.g., CO2, Alexanderite, Nitorgen, etc., are also potenially usable).

To avoid later sector-inconsistency error, when inscribing the optical clock pattern 14 the media disk 18 can be rotated at either a constant and very precise known speed, or at merely a constant speed to which the marking system 64 is then synchronized. One way to obtain a known speed for this is to simply use rotational components in the fixture which are specially designed to impart exactness. However, this may not permit attaining, stabilizing, and being able to rely upon a particular speed rapidly. A manufacturer may want confirmation of these before proceeding, therefore a measuring capability can be added. Various rotation or angular position measurement and servo loop feedback techniques (most of them quite conventional) can be used for this to insure that a desired speed is attained and, subject to the limitations of the mechanical fixture components, then maintained to an extremely high degree of accuracy. Alternately, using a slightly different variation, rather than even aiming for a particular "known" speed the intention can merely be to reach a speed roughly close to optimal, to precisely maintain that speed regardless of what it may be, and to then measure that speed to synchronize the marking system 64 so that an optimal optical clock pattern 14 is written at that particular speed.

Using a fixture to hold the media disk 18 and inscribing the optical clock pattern 14 outside of the hard drive 12 is not necessary. The hub 20 (rather than an outside media disk 18 in the disk platter 16) may be coated with a layer of PMMA (Polymethylmethacrylate, commonly known as PLEXYGLASS, TM, or LUCITE, TM). Then the optical clock pattern 14 can be inscribed into the hub 20 at any point prior to the actual servo pattern writing, even after the hard drive 12 is physically assembled and sealed (as long as a suitably transparent window is provided). For this technique the thin layer of PMMA coating is chosen to be transparent to the laser wavelength used for marking the surface of the hub 20, and it thus does not unduly absorb the laser energy itself. The beam 72, via the focusing lens 68 and the mirror 70, is arranged so that its focal point is on the surface of the hub 20, i.e. concentrating the laser energy density. When the surface, typically metal, of the hub 20 is melted by the beam 72 in this manner the PMMA layer remains solid and acts as a protective layer to prevent any metal vapor escaping.

Non-optical techniques for inscribing the optical clock pattern 14 are also possible. For example, a simple optically detectable pattern can be machined, e.g., "scribed." Or, much as phonograph records and compact disks are "pressed," the optical clock pattern 14 may be mechanically inscribed. Or chemical etching can be used, including (admittedly partially "optical") photo-resist techniques similar to those widely used for printed circuit board and semiconductor manufacturing. Or, if necessary broadening the definition of "inscribe" to include to "affix," a defraction grating may be placed on the platter.

As noted in passing above, the optical clock pattern 14 need not be inscribed on the media disk 18. It may be placed on any optically accessible location which rotates in direct relationship with the media surface 26 where the servo pattern is to later be written, i.e., essentially any accessible place on the disk platter 16. The hub 20 is a fine location for this, and so are the outer region 30 and the inner region 32 of the media disk 18. Whether the R/W head 24 can ever access the clock pattern or whether there is magnetic media present at the clock pattern are now irrelevant. In fact, by deliberately placing the optical clock pattern 14 in such alternate locations the size of the central region 28 of the media disk 18 may in some cases be increased by one track, and this used to provide additional storage capacity in the hard drive 12.

One somewhat less than initially obvious location to inscribe the optical clock pattern 14 is on the outer radial edge of a media disk 18 (envision this by looking at the serrations around the edges of many common coins). This variation can particularly be used to advantage with some existing hard drive designs. Since prior art clock pattern writing has required the physical introduction of a clock head directly adjacent to the outer region of a media disk, the housings for many hard drives today have a special access portal provided for this purpose. Now rather than use this portal for physical access it can be used instead as a window (covered with a transparent material if desired) for the beam 72 and later for the beam 62 to optically access the edge of a media disk 18 (horizontally, assuming conventional orientation of the hard drive 12 during manufacturing). Of course, the optical clock pattern 14 inscribing and detecting techniques depicted respectively in FIGS. 3 and 4 would require minor changes in physical component placements to direct the beams 72 and 62 horizontally, but such changes are quite minor.

In the above discussion the term "window" has been used when optical access is discussed and the term "portal" used when physical access is discussed. This distinction is intentional, and is done to clarify and emphasize some important advantages of the invention. For present purposes, a window can merely be transparent, rather than open like a portal; a window can optically access a hermetically sealed structure, while an open portal for physical access by its very nature dictates that the structure is not sealed. As discussed above in the Background Art section, in the context of precision devices (including hard drives and other storage units) where air born contaminants are of major concern the ability to seal the device as early as possible in the assembly process is highly desirable.

For example, in the context of hard drive manufacturing the inventive optical clock pattern apparatus 10 may be used in concert with non-invasive techniques for servo pattern writing in already hermetically sealed hard drive 12 workpieces. The optical clock pattern 14 can be inscribed onto any suitable component of what will only later become the assembled disk platter 16, e.g., the hub 20 or someplace on one media disk 18 only (among the potentially many such disks that may go into the platter in a particular hard drive design). Inscribing the optical clock pattern 14 can thus be done long before the component is used in assembly, say by a component parts vendor. Then potentially even months later, the manufacturer can rapidly assemble and hermetically seal the hard drive 12, and be concerned only with contamination already inside the drive housing 34 or introduced by actual drive components, rather than additionally what would previously have been able to migrate in through open portals and on clock and servo pattern writing apparatus during the drawn out steps of writing these patterns. Thus, use of the present inventive optical clock pattern apparatus 10 in some manufacturing scenarios can even eliminate the need for what have heretofore been considered necessary clean room facilities.

With regard to non-invasive servo pattern writing, the present inventor is the inventor of U.S. Pat. No. 5,315,372 for a "Non-Contact Servo Track Writing Apparatus Having Read/Head Arm And Reference Arm," as well as a number of currently pending patent applications for such servo writing systems which can be used in concert with the present invention.

A second preferred embodiment of the present invention is a method for writing a servo pattern in storage units employing rotating media disks. As illustrated in the various drawings herein, and particularly in the views of FIG. 4a and FIG. 4b, a form of this preferred embodiment is depicted by the general reference character 100.

The inventive optical clock pattern method 100 may be used in largely a conventional manner, i.e., to inscribe a clock pattern and then write a servo pattern into an open workpiece hard drive 12 before it is sealed in a later manufacturing step. Even used in this manner the optical clock pattern method 100 has its advantages, like eliminating close clock head to media disk spacing. However, the optical clock pattern method 100 may also be used with the two variations depicted FIG. 4a and FIG. 4b even more advantageously.

As illustrated in FIG. 4a, the optical clock pattern method 100 may include reordering hard drive 12 assembly steps in the following manner. First, in a step 102 the optical clock pattern 14 (see e.g., FIG. 2 or FIG. 3) is inscribed into the partially assembled hard drive 12; next, in a step 104 the hard drive 12 is further assembled, at least to the point of hermetically sealing it; and finally, in a step 106 the servo pattern is written into the now sealed hard drive 12. Also shown in FIG. 4a (in ghost outline) is a clean region 108 depicting the portion of the manufacturing process during which special care must be taken to prevent and eliminate contamination in the hard drive 12. It should particularly be appreciated that step 102 and step 106 are outside of the clean region 108, which is not the case for the equivalent steps in the prior art.

As illustrated in FIG. 4b, the optical clock pattern method 100 may alternately include reordering the hard drive 12 assembly steps in this manner. First, in a step 110 the physical assembly of the hard drive 12 is taken at least to the point of hermetically sealing it; next, in a step 112 the optical clock pattern 14 is inscribed into the now sealed hard drive 12 (for example using the PMMA technique discussed above); and finally, in a step 114 the servo pattern is written into the now sealed hard drive 12. In FIG. 4b (in partial ghost outline) a clean region 116 also depicts the portion of the manufacturing process during which special care must be taken to prevent and eliminate contamination in the hard drive 12. Here it should particularly be appreciated that step 112 and step 114 are outside of the clean region 116 (again, something not the case for equivalent steps in the prior art).

In addition to the above mentioned examples, various other modifications and alterations of the inventive apparatus and method may be made without departing from the invention. Accordingly, the above disclosure is not to be considered as limiting and the appended claims are to be interpreted as encompassing the true spirit and the entire scope of the invention.

INDUSTRIAL APPLICABILITY

The present optical clock pattern apparatus 10 and optical clock pattern method 100 are well suited for application in manufacturing information storage units.

In information storage units requiring a clock pattern which are hermetically sealed during assembly to prevent airborne contamination, the present invention permits such sealing at a much earlier stage. The clock pattern can be inscribed into a component well before assembly, then sealing during assembly carried out without any delay for writing the clock pattern. Further, since the apparatus for clock pattern writing is not needed at assembly, the immediate assembly environment simpler. For example, rather than needing a "clean room" which is room size a mere clean chamber may be used instead. Such clean rooms are a large capitol expense, and the maintenance of them and the awkwardness of using them add considerable additional expense. The present invention reduces or even eliminates the need for clean rooms in assembling some information storage units, thus reducing manufacturing costs considerably.

Alternately, the present invention permits inscribing the clock pattern after sealing the storage unit, thus in another manner providing the same benefits mentioned above.

In general, using the present invention to on sealed storage units to prevent ingress of some airborne contamination, information storage units can be manufactured which are more reliable and have longer useful operating lives.

In information storage units requiring a clock pattern, the present invention also permits both inscribing and detecting a clock pattern optically. Since optical methods typically can be used at much greater distance than other methods, such as mechanical, chemical and electromagnetic ones, the present invention permits keeping tooling and workpiece further apart during some stages of manufacturing. This reduces or prevents breakage of tooling and scrapage of workpieces, and in some case can permit increasing the speed of steps in manufacturing which heretofore were slowed because these were a concern. Of course, less breakage and scrapage, and increased speed all contribute to increased efficiency and reduced cost in manufacturing.

In information storage units where storage media has heretofore been used to store a clock pattern used only during assembly for writing a servo pattern later used for user data access, the present invention permits moving the clock pattern elsewhere, thus permitting more efficient use of the storage media and increasing the capacity of the storage unit.

The inventive apparatus and method have herein been described primarily with regard to hard drives. However, it should be appreciated this has been merely for illustration and is not a limitation. They may also be employed with other present and potentially new types of information storage units. Any information storage system requiring a clock pattern to write a servo pattern during assembly is a potential candidate for use of the present invention. While such has generally been magnetic storage systems to date, largely because these presently produce highest practical storage density, other storage systems are also candidates as increased storage density and reliability are sought when using them. In particular, optical storage units are potential candidates, particularly as such using high density concentric tracks rather than a single spiral track are introduced.

For the above, and other, reasons, it is expected that the optical clock pattern apparatus 10 and optical clock pattern method 100 of the present invention will have widespread industrial applicability. Therefore, it is expected that the commercial utility of the present invention will be extensive and long lasting.

What is claimed is:

1. A method for inscribing a clock pattern in an information storage unit of the type containing a platter of disk shaped storage media which rotates about an axis, the method comprising the steps of:

specifying an annulus on the platter which is nominally centered on the axis;

defining a separation value which equates to the circumference of said annulus divided by an integer value representing a number of clock marks desired in the clock pattern;

inscribing said clock marks in said annulus such that they are optically detectable and each adjacent pair thereof are consistently spaced apart by said separation value and the cumulative total number thereof equals said integer value, thereby forming the clock pattern.

2. The method of claim 1, wherein said step of inscribing uses a mechanical marking system to make said clock marks in said platter and said mechanical marking system employs at least one operation from the set consisting of etching, inscribing, and pressing.

3. The method of claim 1, wherein said step of inscribing uses an optical marking system to make said clock marks in said platter.

4. The method of claim 3, wherein said step of inscribing includes providing a light beam from a laser, directing said light beam with optics provided therefor in said optical marking system, and making said plurality of clock marks in said annulus using energy in said light beam.

5. The method of claim 4, wherein said step of inscribing includes maintaining the platter stationary, controlling emission of said light beam from said laser, and directing said light beam based upon said separation value such that said plurality of clock marks are thereby inscribed consistently spaced apart in said annulus.

6. The method of claim 4, wherein said step of inscribing includes rotating the platter about the axis, controlling emission of said light beam from said laser based upon the speed of rotation of the platter, and directing said light beam such that said plurality of clock marks are thereby inscribed consistently spaced apart in said annulus.

7. The method of claim 4, wherein said step of inscribing includes focusing emission of said light beam from said laser through a coating over the annulus which is suitably transparent to said light beam, such that said plurality of clock marks are inscribed without any discharge of material from the platter into a surrounding environment.

8. A storage unit made by the method of claim 1.

9. An apparatus for inscribing a clock pattern in an information storage unit of the type containing a platter of disk shaped storage media which rotates about an axis, the apparatus comprising:

a laser system for emitting a light beam capable of marking the platter in a manner which is optically detectable;

means for directing said light beam to a target position within an annulus defined on the platter and nominally centered about the axis, wherein said means for directing includes a lens system and a mirror system and means for aiming said mirror system to point said light beam respectively into each of a plurality of said target positions spaced around said annulus and equaling said integer count in number, thereby inscribing the clock pattern optically when the platter is stationary; and means for controlling both said laser system and said means for directing such that a desired integer count of clock marks are inscribed consistently spaced apart in said annulus, thereby forming the clock pattern optically.

10. An apparatus for inscribing a clock pattern in an information storage unit of the type containing a platter of disk shaped storage media which rotates about an axis, the apparatus comprising:

a laser system for emitting a light beam capable of marking the platter in a manner which is optically detectable;

means for directing said light beam to a target position within an annulus defined on the platter and nominally centered about the axis; and means for controlling both said laser system and said means for directing such that a desired integer count of clock marks are inscribed consistently spaced apart in said annulus, thereby forming the clock pattern optically, wherein said means for controlling includes means for timing emitting said light beam so that said clock marks are each respectively written at a single said target position as the platter is rotated about the axis, thereby inscribing the clock pattern optically when the platter is moving, and said means for timing is synchronized to a pre determined set speed of rotation of the platter, to thereby inscribe said clock marks such that they are consistently spaced apart and total said integer count in number.

11. An apparatus for inscribing a clock pattern in an information storage unit of the type containing a platter of disk shaped storage media which rotates about an axis, the apparatus comprising:

a laser system for emitting a light beam capable of marking the platter in a manner which is optically detectable;

means for directing said light beam to a target position within an annulus defined on the platter and nominally centered about the axis; and means for controlling both said laser system and said means for directing such that a desired integer count of clock marks are inscribed consistently spaced apart in said annulus, thereby forming the clock pattern optically, wherein said means for controlling includes means for timing emitting said light beam so that said clock marks are each respectively written at a single said target position as the platter is rotated about the axis, thereby inscribing the clock pattern optically when the platter is moving, and said means for timing includes means for determining the actual rotation speed of the platter, to thereby inscribe said clock marks such that they are consistently spaced apart and total said integer count in number.

12. A method for writing a servo pattern in an information storage unit having a rotating platter of disk shaped storage media, the method comprising the steps of:

coating the platter with a protective layer which is suitably transparent to said light beam, wherein said step of coating uses PMMA as the material for said protective layer;

assembling the storage unit;

scaling the storage unit hermetically;

rotating the platter within the storage unit;

inscribing a clock pattern into the platter of the storage unit, including:
synchronizing emission of a light beam with the rotation of said platter;
directing said light beam through a suitably transparent window in the storage unit; and
marking said clock pattern into the platter of the storage unit with said light beam;

detecting said clock pattern optically; and writing the servo pattern into the storage media in relationship to said clock pattern.

* * * * *